US006339928B1

United States Patent
Göllner

(10) Patent No.: US 6,339,928 B1
(45) Date of Patent: Jan. 22, 2002

(54) SYSTEM FOR CONTROLLING A HYDRAULIC PROPULSION DRIVE

(75) Inventor: Wilhelm Göllner, Neumünster (DE)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/606,719

(22) Filed: Jun. 29, 2000

(30) Foreign Application Priority Data

Jun. 30, 1999 (DE) .......................... 199 30 056

(51) Int. Cl.[7] ............................... F16D 31/02
(52) U.S. Cl. ........................................ 60/464
(58) Field of Search ................ 60/464, 468, 490

(56) References Cited

U.S. PATENT DOCUMENTS 4,531,369 A * 7/1985 Izumi et al. ............... 60/456
5,628,187 A * 5/1997 Gollner ..................... 60/327

FOREIGN PATENT DOCUMENTS

DE        24 22 482 A1    5/1974
DE        195 05 691 A1   2/1995

* cited by examiner

Primary Examiner—Edward K. Look
Assistant Examiner—Michael Leslie
(74) Attorney, Agent, or Firm—Zarley, McKee, Thomte, Voorhees & Sease, PLC

(57) ABSTRACT

A loop flushing arrangement for controlling a closed circuit hydraulic propulsion drive. The variable displacement pump 12 is driven by a combustion engine 11. A flush valve 21 is used to clean and cool the hydraulic fluid in the closed hydraulic circuit. The flush valve is electrically operated and, as a result, permits novel and varied control options. The flush valve is controlled automatically, for example by a digital computer 1 as a function of the vehicle speed, the rotational speed of the combustion engine 11, or the temperature of the hydraulic fluid in the variable displacement pump 12. This results in the flushing procedure only being triggered and carried out if the operating state of the vehicle requires and permits it, i.e. when traveling at high speeds, for example.

8 Claims, 3 Drawing Sheets

SYSTEM FOR CONTROLLING A HYDRAULIC PROPULSION DRIVE

BACKGROUND OF THE INVENTION

The invention relates to a system for controlling a hydraulic propulsion drive, having a closed hydraulic circuit which has a variable displacement pump driven by a driving motor, activation valves, a hydraulic motor driving the vehicle, and a flush valve.

Systems of this type are part of the prior art. The flush valve is used in this case in order to renew the hydraulic fluid from the closed circuit during operation. This renewing is intended to prevent the hydraulic fluid in the closed circuit from becoming increasingly contaminated by particles due to abrasion. Furthermore, excessively high temperatures of the hydraulic fluid in the closed circuit are thereby avoided. In the case of these known systems, the flush valve is hydraulically controlled. The system of a changeover slide valve has the effect that it is always the line having the lower operating pressure (return line) which is connected to the flush valve. At a certain value, the pressure prevailing in this low pressure line then automatically opens the flush valve. It is also already known to combine the flush valve with an orifice connected upstream, or just to use an orifice. The version having a pressure-operated flush valve and orifice has the advantage that the quantity to be flushed can be set more readily. This is because the quantity of hydraulic fluid flushed out results from the diameter of the orifice and the set value of the low pressure. The use of just an orifice is particularly cost effective.

Common to these known solutions is the fact that the flushing procedure is always determined as a function of the hydraulic fluid pressure prevailing in the low pressure line of the closed hydraulic circuit. In this case, however, flushing can not always be done in accordance with requirements because the flushing procedure is triggered and controlled independently of the contamination and the temperature of the hydraulic fluid.

Therefore, the principal object of this invention is to control the flushing procedure in such a manner that it fulfills the actual requirements, i.e. the extent of contamination and of heating of the hydraulic fluid, with the use of an electrically controlled flushing valve.

SUMMARY OF THE INVENTION

The invention relates to a system for controlling a hydraulic propulsion drive, having a closed hydraulic circuit which has a variable displacement pump driven by a driving motor, activation valves, a hydraulic motor driving the vehicle, and an electrically controlled flush valve.

The electrical control makes provision for the prerequisite of it being possible for the flushing procedure to be triggered and controlled as a function of other essential influencing variables, rather than just by the pressure of the hydraulic fluid in the low pressure line of the closed hydraulic circuit. The advantages of integrating it into a modern, versatile, automatic control are very substantial.

Particular advantages result if the flush valve is controlled as a function of the vehicle speed, the rotational speed of the driving motor and/or of the temperature of the hydraulic fluid in the variable displacement pump in the closed hydraulic circuit. Specifically, the flushing takes place if the vehicle speed, the rotational speed of the driving motor and/or the temperature of the hydraulic fluid in the variable displacement pump are high. The flushing procedure is always only initiated and carried out if the particular operating conditions of the vehicle permit and require it.

The closed hydraulic circuit needs to be flushed, in particular at high traveling speed, because low pressure in this case means that only a smaller amount of hydraulic fluid leaks out of the closed circuit. In addition, at high traveling speed the variable displacement pump of the closed hydraulic circuit has to convey a maximum amount of hydraulic fluid, the frictional losses of the power train components and the flow being at a maximum, and most lost heat is being produced.

Since the flush valve is electrically controlled, the dependence on the numerous operating parameters can be realized with particular advantages in an automatic control.

In the case of a vehicle having a combustion engine as the driving motor for the variable displacement pump of the closed hydraulic circuit, the automatic control can be implemented with a digital computer which is connected on the input side to sensors. The sensors are situated on the vehicle and give information about the vehicle speed, the rotational speed of the combustion engine and/or the temperature of the hydraulic fluids in the variable displacement pump of the closed hydraulic circuit, and which controls the flush valve after processing this data.

The digital computer evaluates the signals supplied by the sensors and concerning the operating stage of the vehicle. Via its software, the computer switches the flush valve on if the vehicle speed or the rotational speed of the combustion engine or the temperature of the hydraulic fluid in the variable displacement pump are high. Conversely, when traveling slowly and at low rotational speed of the combustion engine, the flushing procedure is automatically terminated. In practice that means only permitting the flushing procedure at, a relatively high traveling speed, or when critical temperature limits, are exceeded, or at high rotational speeds of the combustion engine, because the feed pump is then able to convey a sufficient amount of hydraulic fluids.

DESCRIPTION OF THE PREFERRED EMBODIMENT

Figure 1:
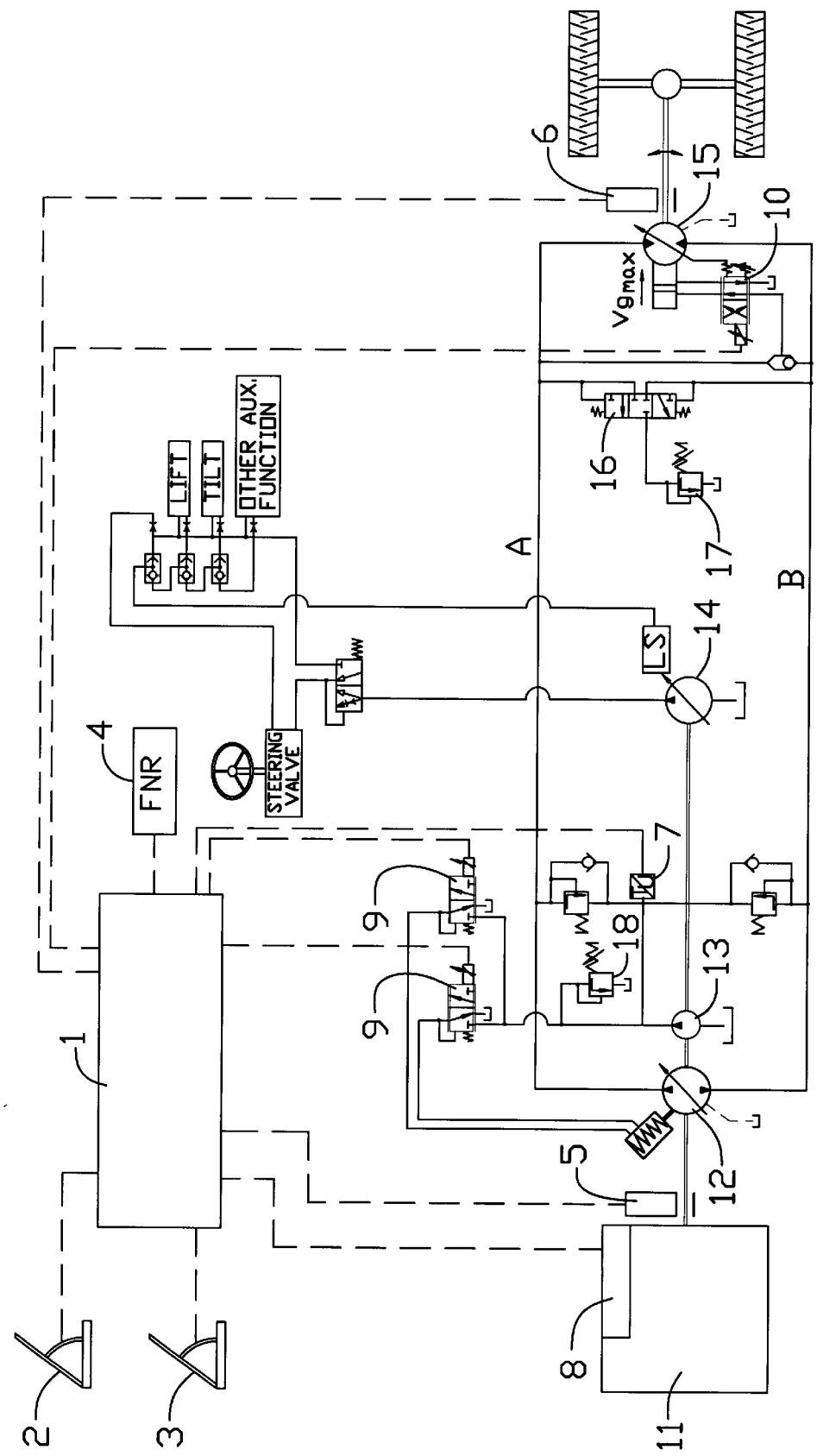
FIG. 1 is a schematic drawing of the system in prior art, where the loop flushing flow depends on the pressure relief valve setting.

The following is a list of the parts and numerals therefor as used in the drawings and specification for the instant invention.

1 Digital computer
2 Gas pedal (accelerator pedal)
3 Brake pedal
4 Direction of travel transmitter or switch (forward/neutral/reverse)
5 Speed sensor (rpm)
6 Speed sensor (hydraulic motor rpm)
7 Temperature sensor
8 Injection system of engine 11
9 Activation valves for pump 12

Figure 2:
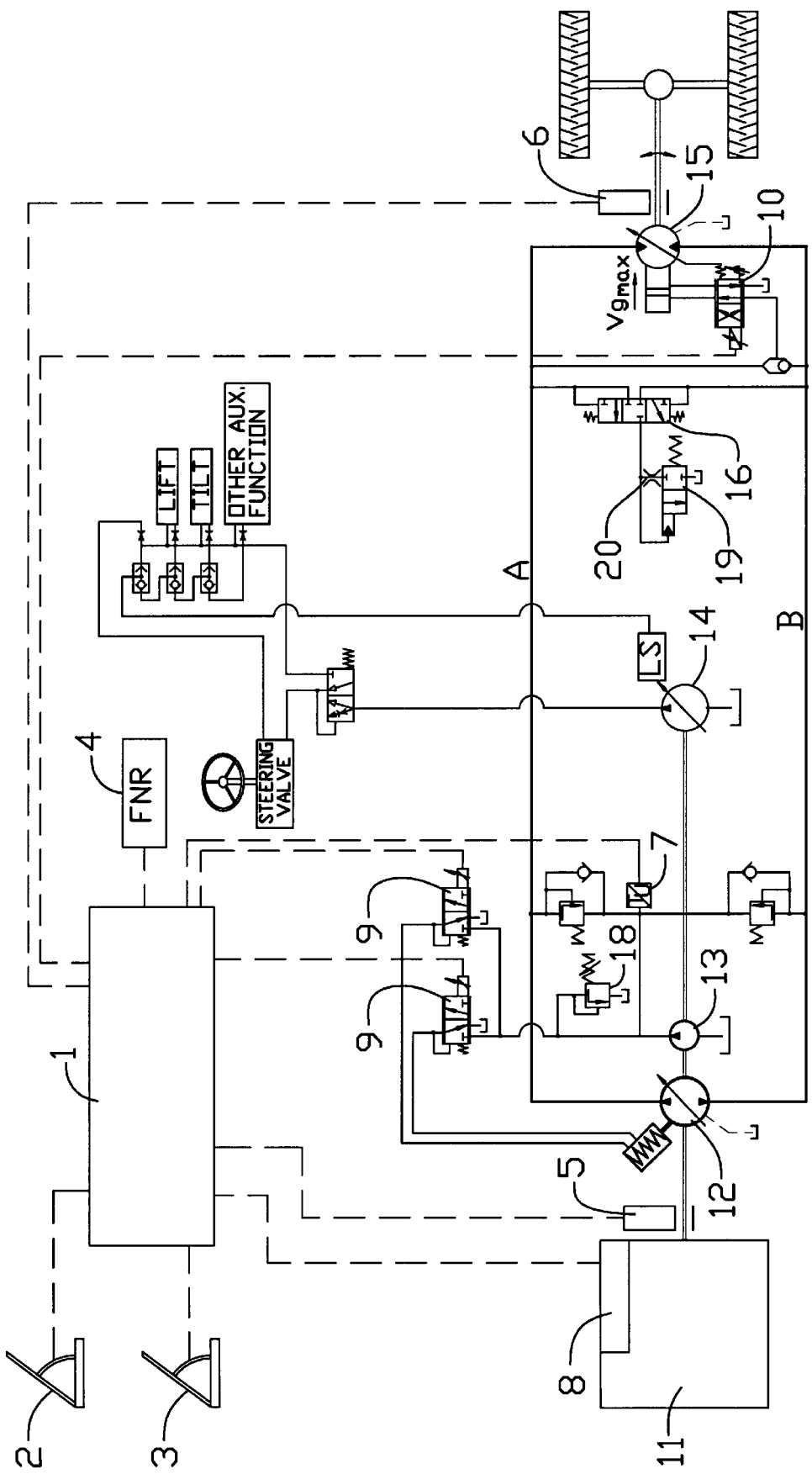
FIG. 2 is a schematic drawing of the system in prior art, where the loop flushing flow depends on an orifice which is shut off by low charge pressure.
Figure 3:
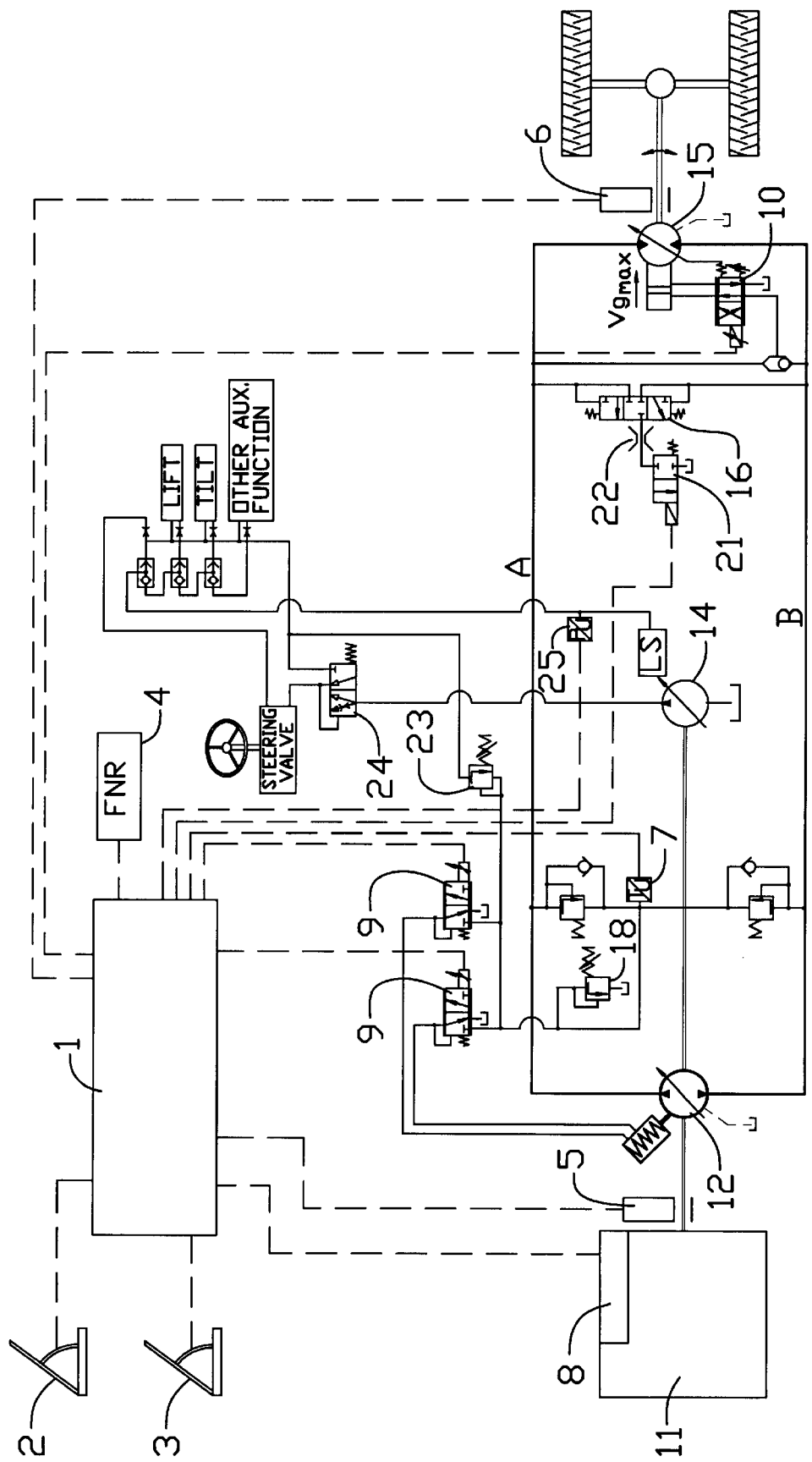
FIG. 3 is a schematic drawing of this invention, where the loop flushing is controlled by an orifice and where the flow is shut off by the electrical 2 position valve.

10 Activating means (electrical displacement control for hydraulic motor 15)
11 Diesel combustion engine
12 Variable displacement pump
13 Charge pump in FIGS. 1 and 2
14 Feed pump (load sensing pump for open circuit)
15 Variable displacement hydraulic motor
16 Slide valve or loop flushing check valve
17 Loop flushing pressure relief valve in FIG. 1
18 Charge pressure relief valve
19 Loop flushing valve in FIG. 2
20 Loop flushing orifice in FIG. 2
21 Flush valve (electrical 2-position valve for loop flushing)
22 Orifice
23 Pressure reducing valve in FIG. 3 (for charging the closed circuit)
24 Priority valve
25 Pressure sensor FIGS. 1–3 show drives for wheel loaders and high-lift trucks. FIGS. 1 and 2 show conventional hydraulically controlled flushing valve arrangements, whereas FIG. 3 shows a flushing valve equipped with the electronic control system of this invention. Similar reference numerals identify similar components in the drawings.

A variable displacement pump 12 and a hydraulic motor 15, which is designed as a variable displacement motor, are connected to each other via connecting lines A and B for the hydraulic fluid. The variable displacement pump 12 obtains its rotational drive from a combustion engine 11, which is designed as a diesel engine having an injection system 8. The variable displacement pump 12 is controlled via two activation valves 9 and drives the variable displacement motor 15 with varying direction and speed of rotation. The variable displacement motor 15 acts on the driving wheels of the vehicle and has a conventional activating means 10. The variable displacement pump 12, the connecting lines A, B and the variable displacement motor 15 form the basic elements of the closed hydraulic circuit, which is used for the driving operation. The hydraulic fluid flows continuously in the circuit from the variable displacement pump 12 to the variable displacement motor 15 and back. The hydraulic energy is transferred from the variable displacement pump 12 to the variable displacement motor 15, and is transferred the other way round during the braking operations. The connecting lines A, B have varying functions; each can be a feed or return line, so that the pressure prevailing in each case in them of the hydraulic fluid likewise differs.

The combustion engine 11 does not only drive the variable displacement pump 12 of the closed hydraulic circuit, but also other pumps such as a charge pump 13 (FIGS. 1 and 2) and/or feed pump 14 (FIG. 3). The latter feeds the open hydraulic circuit, which is used for the additional auxiliary operating functions, such as steering, lifting and tipping. A comparatively high pressure prevails in the open hydraulic circuit, and the used hydraulic fluid flows back entirely into the storage container.

The feed pump 14 also takes over the feeding of hydraulic fluid into the closed hydraulic circuit for the driving operation, via the priority valve 24 and the pressure reducing valve 23. (FIG. 3) The pressure reducing valve 23 therefore determines the comparatively low pressure of the hydraulic fluid in the closed hydraulic circuit. However, a separate auxiliary pump for feeding hydraulic fluid into the closed hydraulic circuit may also be available.

The electrically actuable flush valve 21 (FIG. 3) is provided so that some of the hydraulic fluid flowing in the closed hydraulic circuit can be renewed during routine operation, if required. An orifice 22 (FIG. 3) may be connected upstream of said flush valve 21. A changeover slide valve 16 has the effect that the flush valve 21 is always brought into connection with one of the two connecting lines A, B in which the lower pressure prevails. When the flush valve is open, a certain amount of hydraulic fluid is withdrawn from the closed hydraulic circuit and supplied to a fluid storage container. This amount is compensated for by the feed pump 14.

A digital computer 1 forms the central control member. It receives signals from the driver via the gas pedal 2, the brake pedal or inch pedal 3, and the direction of travel transmitter 4. One sensor 5 transmits a signal for the rotational speed of the combustion engine 11. A further sensor 6 indicates the rotational speed of the variable displacement motor 15, and yet another sensor 7 indicates the temperature of the hydraulic fluid in the variable displacement pump 12. The digital computer 1 processes the input signals in its software and controls the injection system 8 of the combustion engine, and also the activation valve 9 of the variable displacement pump 12 and the activating means 10 of the variable displacement motor 15.

The system described operates as follows: If the vehicle is traveling at high speed, the hydraulic fluid in the closed hydraulic circuit heats up. This is because when traveling at high speed no additional operating functions are activated; no hydraulic fluid flows from the open hydraulic circuit back into the supply container, and the amount of hydraulic fluid emerging from the closed hydraulic circuit with its low leakage is, small. However, since the variable displacement pump, 12 has to produce its maximum conveying amount and since the frictional losses of the power train components and the flow are at a maximum, the hydraulic fluid heats up particularly sharply, and the actuation of the flush valve 21 is required. This is indicated by the sensor 15 with a signal for high vehicle speed and by the sensor 7 with a signal for a high temperature of the hydraulic fluid in the variable displacement pump, passed to the digital computer 1 and converted by means of the software into a control command for opening the flush valve 21.

If the rotational speed of the combustion engine 11 is high, which is indicated by the sensor 5, the flushing procedure can likewise be triggered promptly, because in this case the feed pump 14 of the open hydraulic circuit is conveying a sufficient amount of hydraulic fluid.

If, in contrast, the vehicle is stationary and the additional operating functions are being carried out, the pressure of the hydraulic fluid in the operating line of the open hydraulic circuit is high; this is likewise detected by a command to the valves 9 and the speed sensor 6 and/or the pressure sensor 25 at the feed pump 14 and passed on to the digital computer.

In this case, the flush valve 21 remains closed, and flushing is also not required because the leakage from the positive displacement pumps and motors and also from their high pressure valves and regulators is sufficient in order to ensure sufficient flushing, and therefore temperature reduction. It is likewise possible to calculate via the digital computer 1 whether the feed pump 14 is reaching its conveying limit. The conveying amount limit of the feed pump can be calculated by adding up the amounts of the individual consumers in the operating hydraulic unit (results from opening the individual valves). However, this only applies in the case of electrically activated valves. Even then the flushing has to be switched off so that a relatively large amount of the hydraulic fluid is available for the operating cylinders of the additional operating functions. A pivot angle sensor on the feed pump 14 would be the alternative.

For energy reasons, it may also be advantageous to detect the pressure of the operating hydraulic unit and to switch off the flushing at high pressure. This is because at this moment heat becomes free at the pressure reducing valve 23 because of the reduction in pressure from, for example, 200 bar to 25 bar. This heat has to be made available, on the one hand, by the combustion engine and, on the other hand, causes a negative load on the temperature maintenance of the system. This lost energy can amount in all to 6 to 8 kW.

The amount of hydraulic fluid to be flushed out results from the switch-on time and the size of the orifice 22 (FIG. 3) in conjunction with the level of pressure in the closed hydraulic circuit. The switch-on time can be controlled as desired by means of the digital computer 1, i.e. from 0 to 100% of the time, by modulating the switch-on and switch-off time.

The arrangement according to the invention is particularly advantageous in a vehicle having additional operating functions, for example a wheel loader or a forklift truck, and having an open hydraulic circuit which is used for the additional operating functions and is fed by a feed pump, which is driven by the combustion engine. In a vehicle of this type, if the flush valve is controlled hydraulically in a known manner, the problem arises of the closed and the open hydraulic circuits affecting each other.

The known operating method can also be inclined toward if, conventionally for the closed hydraulic circuit, an auxiliary pump is provided which feeds hydraulic fluid into the closed hydraulic circuit and in so doing ensures that under all operating conditions there is a sufficient amount of hydraulic fluid. This auxiliary pump generally has to be oversized so that a sufficient amount is conveyed even if the speed of the driving motor is low. However, in relatively new systems the auxiliary pump for the closed hydraulic circuit is no longer available. In the case of these hydraulic drives, with the aim of saving on costs, reduced outlay on piping, and an improvement in efficiency, the feed pump of the open hydraulic circuit, which brings about the additional operating functions, also takes over the feeding of hydraulic fluid into the closed hydraulic circuit. For this purpose, a supply line for the closed hydraulic circuit is branched off from the feed line of the open hydraulic circuit via a pressure reducing valve. This joins together the feeding-in procedures for the closed and the open hydraulic circuits, which may lead to them adversely affecting each other during the flushing procedures.

According to claim 5, the arrangement is therefore developed in such a manner that sensors are provided, which give information about the load, caused by the additional operating functions, on the open hydraulic circuit, and that the digital computer additionally controls the flush valve as a function of this load in such a manner that it is opened, if the load is low.

This development has the result that the driving operation based on the closed hydraulic circuit, and also every additional operating function brought about by the open hydraulic circuit proceed in an optimum manner, without interfering with each other, and with improved efficiency of the system and improved temperature maintenance.

It is precisely during high traveling speed that the operating hydraulic system is typically not required and has a sufficient amount for feeding into the closed circuit and therefore for flushing.

If, in contrast, the vehicle is stationary and additional operating functions are being carried out, the load on the open hydraulic circuit is high, and additional driving power is no longer available in order to provide additional hydraulic fluid to the closed hydraulic circuit as replacement for the amount flushed out. However, in this state the leakage from the positive-displacement pumps and motors and also from their high pressure valves is frequently also sufficient in order to bring about sufficient flushing and therefore a reduction in the temperature of the hydraulic fluid in the closed hydraulic circuit.

The signal for the vehicle speed is advantageously obtained by a sensor for detecting the rotational speed of the hydraulic motor driving the vehicle.

It is therefore seen that the invention will accomplish at least all of its objectives.

What is claimed is:

1. A system for controlling a hydraulic propulsion drive in a vehicle comprising:
   an engine;
   a variable displacement pump for displacing hydraulic fluid controlled by activation valves connected thereto, the variable displacement pump being driven by the engine;
   a hydraulic motor connected to the variable displacement pump in a closed hydraulic circuit by a feed line and a return line and being adapted to supply rotational energy to drive the vehicle;
   an electrically controlled flush valve operatively associated with the closed circuit and connectable with the return line;
   an electrical control for automatically controlling the flush valve as a function of a sensed temperature of the hydraulic fluid in the variable displacement pump;
   a sensor connected to the electrical control and the variable displacement pump for sensing the temperature of the hydraulic fluid in the variable displacement pump.

2. The system of claim 1 wherein the electrical control includes a digital computer.

3. The system of claim 1 comprising a sensor connected to the electrical control and associated with the hydraulic motor for sensing motor speed, and wherein the electrical control also controls the flush valve as a function of a sensed hydraulic motor speed, said hydraulic motor speed being indicative of vehicle speed, whereby the electrical control generates a command signal to open the flush valve if the motor speed and the temperature of the hydraulic fluid in the variable displacement pump are above predetermined values.

4. The system of claim 1 comprising a sensor associated with the engine and connected to the electrical control, and wherein the electrical control also controls the flush valve as a function of engine speed such that the electrical control sends a command signal to open the flush valve and flushing takes place if the engine speed and the temperature are above predetermined values.

5. The system of claim 1 comprising a vehicle speed sensor connected to the electrical control and associated with the hydraulic motor and an engine speed sensor associated with the engine and connected to the electrical control; wherein the electrical control also controls the flush valve as a function of the vehicle speed and the engine speed.

6. The system of claim 1 comprising an open circuit feed pump driven by the engine for supplying hydraulic fluid to the closed hydraulic circuit and to at least one fluid consumer or auxiliary hydraulic function in an open hydraulic circuit; and a sensor connected to the electrical control and the open circuit feed pump for sensing pressure or load on the open circuit feed pump; the electrical control controlling the flush valve as a function of load on the open circuit feed pump and opening the flush valve when the load is below a given level.

7. The system of claim 1 wherein a fixed orifice is located immediately upstream of the flush valve.

8. A system for controlling a hydraulic propulsion drive in a vehicle comprising:

an engine;

a variable displacement pump for displacing hydraulic fluid controlled by activation valves connected thereto, the variable displacement pump being driven by the engine;

a hydraulic motor connected to the variable displacement pump in a closed hydraulic circuit by a feed line and a return line and being adapted to supply rotational energy to drive the vehicle;

an electrically controlled flush valve operatively associated with the closed circuit and connectable with the return line;

an electrical control for automatically controlling the flush valve as a function of a sensed hydraulic motor speed;

a sensor connected to the electrical control and operatively associated with the hydraulic motor for sensing hydraulic motor speed.

\* \* \* \* \*